United States Patent
Sherman et al.

(10) Patent No.: US 12,027,877 B2
(45) Date of Patent: Jul. 2, 2024

(54) AC TO AC WIRELESS POWER SYSTEMS

(71) Applicant: Powermat Technologies Ltd., Petach Tikva (IL)

(72) Inventors: Itay Sherman, Petach Tikva (IL); Elieser Mach, Petach Tikva (IL)

(73) Assignee: POWERMAT TECHNOLOGIES LTD., Petach Tikva (IL)

( * ) Notice: Subject to any disclaimer, the term of this patent is extended or adjusted under 35 U.S.C. 154(b) by 0 days.

(21) Appl. No.: 18/022,007

(22) PCT Filed: Sep. 21, 2021

(86) PCT No.: PCT/IB2021/058617
§ 371 (c)(1),
(2) Date: Feb. 17, 2023

(87) PCT Pub. No.: WO2022/058995
PCT Pub. Date: Mar. 24, 2022

(65) Prior Publication Data
US 2023/0378812 A1    Nov. 23, 2023

Related U.S. Application Data

(60) Provisional application No. 63/080,795, filed on Sep. 21, 2020.

(51) Int. Cl.
*H02J 50/12* (2016.01)
*H02J 50/40* (2016.01)
*H02J 50/80* (2016.01)

(52) U.S. Cl.
CPC ............. *H02J 50/12* (2016.02); *H02J 50/40* (2016.02); *H02J 50/80* (2016.02)

(58) Field of Classification Search
CPC ............. H02J 50/12; H02J 50/80; H02J 50/40
See application file for complete search history.

(56) References Cited

U.S. PATENT DOCUMENTS

| | | |
|---|---|---|
| 2014/0252877 A1 | 9/2014 | Turki |
| 2015/0145345 A1 | 5/2015 | Long et al. |
| 2015/0311724 A1 | 10/2015 | Callanan |
| 2015/0341085 A1 | 11/2015 | Ettes et al. |
| 2015/0349542 A1 | 12/2015 | Yamamoto et al. |
| 2017/0373537 A1 | 12/2017 | Dayal et al. |
| 2020/0014245 A1 | 1/2020 | Costinett et al. |

FOREIGN PATENT DOCUMENTS

CN    106655538 B    6/2019

OTHER PUBLICATIONS

International Search Report and Written Opinion for Application No. PCT/IB2021/058617 dated Dec. 14, 2021.

*Primary Examiner* — Robert L Deberadinis
(74) *Attorney, Agent, or Firm* — Volpe Koenig

(57) ABSTRACT

A wireless power transmitter is provided herein. The wireless power transmitter includes a coil, transistors, and a controller. The coil provides a magnetic field for a wireless power transfer in accordance with an alternating current power supply providing an alternating current input at a first frequency. The transistors couple to a phase and a zero of the alternating current power supply. The controller switches the plurality of transistors at a second frequency to drive a current across the coil that induces the magnetic field. The current includes an envelope that corresponds to the first frequency of the alternating current input.

20 Claims, 8 Drawing Sheets

AC TO AC WIRELESS POWER SYSTEMS

CROSS REFERENCE TO RELATED APPLICATIONS

This application is a National Stage of International Application No. PCT/IB2021/058617 filed on Sep. 21, 2021, which claims priority from U.S. Provisional Patent Application No. 63/080,795, filed on Sep. 21, 2020, which are hereby incorporated by reference as if set forth in full in this application for all purposes.

BACKGROUND

The disclosure relates generally to wireless power systems, and more specifically, to alternating current (AC) to AC wireless power systems.

In general, contemporary implementations of wireless power transfer methods provide for power transfer between a power transmitter (Tx) and a power receiver (Rx). The Tx (e.g., whether being an inductive and/or resonant Tx) traditionally operates using direct current (DC) input power and provides a DC output power to the Rx. The Rx is coupled to an electronic device, such as mobile handset. The electronic device prefers DC power. The Rx transfers the DC output power, received from the Tx, to the electronic device accordingly.

However, contemporary implementations are not optimal for target electronic devices that use AC motors, such as kitchen appliances. For example, most household mixers and food processors use AC motors. AC motors prefer AC output power, are generally a lower cost compared to equivalent DC motors, and operate at power levels far higher than mobile handset power levels (e.g., up to 2.2 kW).

Thus, there is an need for an AC to AC wireless power system that can power target electronic devices fitted to operate from the main AC power supply, which would avoid significant internal electronic/power system changes respective to receiving a DC voltage output.

SUMMARY

According to one or more embodiments, a wireless power transmitter is provided herein. The wireless power transmitter includes a coil configured to provide a magnetic field for a wireless power transfer in accordance with an alternating current power supply providing an alternating current input at a first frequency. The wireless power transmitter includes a plurality of transistors configured to couple to a phase and a zero of the alternating current power supply. The wireless power transmitter includes a controller configured to switch the plurality of transistors at a second frequency to drive a current across the coil that induces the magnetic field. The current comprising an envelope that corresponds to the first frequency of the alternating current input.

According to one or more embodiments, a wireless power receiver is provided. The wireless power receiver includes a controller and a coil configured to receive a magnetic field for a wireless power transfer from a wireless power transmitter. The wireless power receiver includes a rectifier configured to produce, as an output, an envelope of a transmitter current signal. The wireless power receiver includes a plurality of transistors configured to produce an absolute value of the envelope based on a switching by the controller.

According to one or more embodiments, the wireless power transmitter and the wireless power receiver above can be implemented as a system, a method, an apparatus, or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
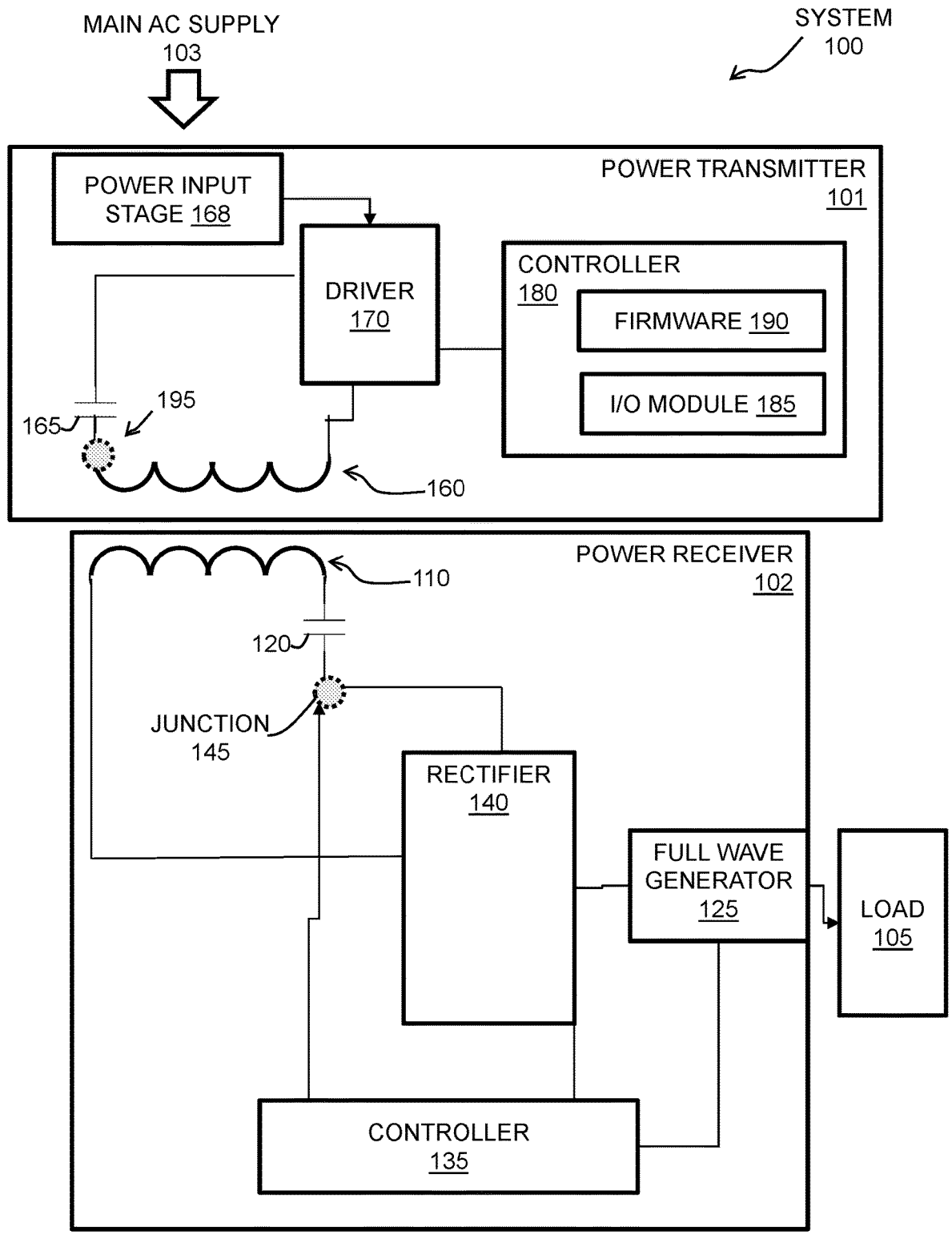
FIG. 1 depicts a system in accordance with one or more embodiments.

Embodiments disclosed herein may include apparatuses, systems, methods, and/or computer program products (e.g., an AC to AC wireless power transfer system) that provide AC to AC wireless power transfers. More particularly, the AC to AC wireless power transfer system provides a solution to systems that require AC power as an input and AC power as an output.

According to one or more advantages, technical effects, and benefits, because AC to AC wireless power transfer is more suitable to target electronic devices that use AC motors, the AC to AC wireless power transfer system optimizes efficiency from a main AC power supply, while lowering complexity and costs for the target electronic devices (in contrast to incorporating a DC based solution therein). Thus, embodiments described herein are necessarily rooted in one or more controllers of the Tx and Rx of the system to perform proactive operations to overcome problems specifically arising in the contemporary implementations of wireless power transfer methods.

According to one or more embodiments, a wireless power transmitter is provided herein. The wireless power transmitter includes a coil configured to provide a magnetic field for a wireless power transfer in accordance with an alternating current power supply providing an alternating current input at a first frequency. The wireless power transmitter includes a plurality of transistors configured to couple to a phase and a zero of the alternating current power supply. The wireless power transmitter includes a controller configured to switch the plurality of transistors at a second frequency to drive a current across the coil that induces the magnetic field. The current comprising an envelope that corresponds to the first frequency of the alternating current input.

According to one or more embodiments or any of the wireless power transmitter embodiments herein, the second frequency can be greater than the first frequency.

According to one or more embodiments or any of the wireless power transmitter embodiments herein, the first frequency can include 50 Hz or 60 Hz.

According to one or more embodiments or any of the wireless power transmitter embodiments herein, the second frequency can be selected from a range of 20 khz to 200 khz.

According to one or more embodiments or any of the wireless power transmitter embodiments herein, one or more time slots around each zero crossing of the current can be utilized for in-band communications by the wireless power transmitter with a wireless power receiver.

According to one or more embodiments or any of the wireless power transmitter embodiments herein, the controller can synchronize the switching of the plurality of transistors to generate the envelope.

According to one or more embodiments or any of the wireless power transmitter embodiments herein, the controller can insert dead time between the switching of the plurality of transistors to prevent one or more shorts of the phase or the zero of the alternating current power supply.

According to one or more embodiments or any of the wireless power transmitter embodiments herein, the plurality of transistors can include field effect transistors.

According to one or more embodiments or any of the wireless power transmitter embodiments herein, the zero and the phase of the alternating current power supply can be connected via two back-to-back N-type metal-oxide-semiconductor (N-MOS) or P-type metal-oxide-semiconductor (P-MOS) field effect transistors.

According to one or more embodiments, a wireless power receiver is provided. The wireless power receiver includes a controller and a coil configured to receive a magnetic field for a wireless power transfer from a wireless power transmitter. The wireless power receiver includes a rectifier configured to produce, as an output, an envelope of a transmitter current signal. The wireless power receiver includes a plurality of transistors configured to produce an absolute value of the envelope based on a switching by the controller.

According to one or more embodiments or any of the wireless power receiver embodiments herein, the rectifier of the wireless power transmitter can include a voltage doubling circuit.

According to one or more embodiments or any of the wireless power receiver embodiments herein, the wireless power receiver can include one or more rectifier capacitors sized to maintain a fluctuation during a wireless power receiver driver oscillation cycle.

According to one or more embodiments or any of the wireless power receiver embodiments herein, the rectifier can be configured to provide a full alternating current wave reconstruction using a transformer or full wave driver.

According to one or more embodiments or any of the wireless power receiver embodiments herein, one or more time slots around each zero crossing of the current can be utilized for in-band communications by the wireless power receiver with the wireless power transmitter.

According to one or more embodiments or any of the wireless power receiver embodiments herein, the wireless power receiver can use the one or more time slots to transmit a digital waveform for 50 bits.

According to one or more embodiments or any of the wireless power receiver embodiments herein, the digital waveform can be transmitted over 8 usec.

According to one or more embodiments or any of the wireless power receiver embodiments herein, the wireless power receiver can provide an alternating current power to an alternating current motor in accordance with the absolute value of the envelope.

According to one or more embodiments or any of the wireless power receiver embodiments herein, the plurality of transistors can include field effect transistors.

According to one or more embodiments, a system is provided. The system includes a wireless power transmitter configured to provide a magnetic field for a wireless power transfer in accordance with an alternating current power supply providing an alternating current input at a first frequency. The wireless power transmitter includes a plurality of first transistors configured to couple to a phase and a zero of the alternating current power supply. The wireless power transmitter includes a controller configured to switch the plurality of first transistors at a second frequency to drive a current across a coil that induces the magnetic field, the current comprising an envelope that corresponds to the first frequency of the alternating current input. The system includes a wireless power receiver configured to receive the magnetic field for the wireless power transfer. The wireless power receiver includes a rectifier configured to produce, as an output, the envelope of a transmitter current signal corresponding to the current. The wireless power receiver includes a plurality of second transistors configured to produce an absolute value of the envelope based on a switching.

According to one or more embodiments of any of the system embodiments herein, one or more time slots around each zero crossing of the current can be utilized for in-band communications between the wireless power receiver and the wireless power transmitter.

FIG. 1 shows a block diagram depicting a system 100 (e.g., a AC to AC wireless power transfer system) in accordance with one or more embodiments. The system comprises a wireless power transmitter 101 and a wireless power receiver 102 (referred herein as Tx 101 and Rx 102, respectively). The Tx 101 is any device that can generate electromagnetic energy from a main AC supply 103 to a space around the Tx 101 that is used to provide power to the Rx 102. The Rx 102 is any device that can receive, use, and/or store the electromagnetic energy when present in the space around the Tx 101. Note that the Tx 101 can have a similar or the same component structure as the Rx 102, and vice versa.

As shown in FIG. 1, the Rx 102 includes circuitry for receiving, providing, and/or storing the electromagnetic energy, which can be further provided to a load 105. According to one or more embodiments, the Rx 102 may be used for charging the load 105, examples of which include an AC motor. The circuitry of the Rx 102 may also include a receiving coil 110; a resonant capacitor 120; a full wave generator 125; a controller 135; and a rectifier 140. In accordance with some example embodiments, the Rx 102 may be used to wirelessly obtain induced power from the Tx 101 for supplying power to a load 105. For instance, an input stage of the Rx 102 includes the receiving coil 110 and the resonant capacitor 120 connected to the rectifier 140 (e.g., full wave or half wave rectification stage). An output of the rectifier 140 is connected to the full wave generator 125 that creates full wave AC output to the load 105. Additionally, the Rx 102 may be capable of wirelessly communication with the Tx 101 (e.g., in-band communication).

According to one or more embodiments, the controller 135 can include a sensing circuit, circuitry, and/or software, for sensing voltage and/or current of a resonance circuit (e.g., a receiving coil 110 and/or resonant capacitor 120) of the Rx 102. The controller 135 can control and/or communicate via junction 145 to provide modulation injections as needed for AC to AC wireless power transfer. The values of the resonance components (e.g., the receiving coil 110 and/or resonant capacitor 120) can be defined to match with a transmitted frequency of the Tx 101. The Rx 102 can be provided with or without the resonant capacitor 120. Additionally, or alternatively, the resonance circuit can further comprise at least one branch each having a tuning capacitor (rcap) controlled by the controller 135.

According to one or more embodiments, the controller 135 can include software therein (e.g., firmware 159) that logically provides a FIR equalizer, an analyzer of in-band communication data, a selector for selecting a ping, a coupler for dynamically determining a coupling factor, a regulator for dynamically determining an operating frequency, etc. In this regard, the controller 135 can have a system memory where software and a processor that executes the software in place to implement operations described herein. The controller 135 can include a central processing unit (CPU) based on a microprocessor, an electronic circuit, an integrated circuit, and/or implemented as special firmware ported to a specific device such as a digital signal processor, an application specific integrated circuit, and any combination thereof, or the like. According to one or more embodiments, the controller 135 can be utilized to perform computations required by the Rx 102 or any of the circuitry therein.

The rectifier 140 can be based on commercially available half-wave rectification; full-wave rectification; field-effect transistor (FET) based full-wave rectification; and any combination thereof, or the like. According to one or more embodiments, the rectifier 140 can be any rectifier using one or more components, such as 4 diodes (e.g., asynchronous rectifier), 2 didoes and 2 FETs (half synchronous), 4 FET (synchronous), or 2 capacitors and 2 switches, that are controlled by either a dedicated logic circuit or the controller 135. According to one or more embodiments, the rectifier 140 can include a voltage doubling circuit designed to provide a doubling of voltage using 2 diodes or FETs with two output capacitors (e.g., as described with respect to FIG. 7).

Similar to the Rx 102, the Tx 101 includes circuitry for generating and transmitting the electromagnetic energy (i.e., transmitting power). The circuitry of the Tx 101 may include a transmitter coil 160; a resonant capacitor 165; a driver 170; an optional power input stage 168; and a controller 180, which further include an input/output (I/O) module 185 and firmware 190. The transmitter coil 160 and the resonant capacitor 165 provide an LC circuit for generating an inductive current in accordance with operations of the driver 170 and the controller 180 to support power transmissions.

According to one or more embodiments, a transmitter resonance circuit includes the transmitter coil 160, the resonant capacitor 165, and the driver 170 where one side of is connected to a zero connection of the main AC supply 103 and another side is connected to a phase. The zero connection and the phase can each be connected via two back-to-back FETs (e.g., as described with respect to FIG. 2), so connection to either phase or zero can be made by the transmitter resonance circuit. Note that alternative electronic switches can include N-type metal-oxide-semiconductor (N-MOS) FETs, P-type metal-oxide-semiconductor (P-MOS) FETs, relays, or other electrical switch components.

Figure 2:
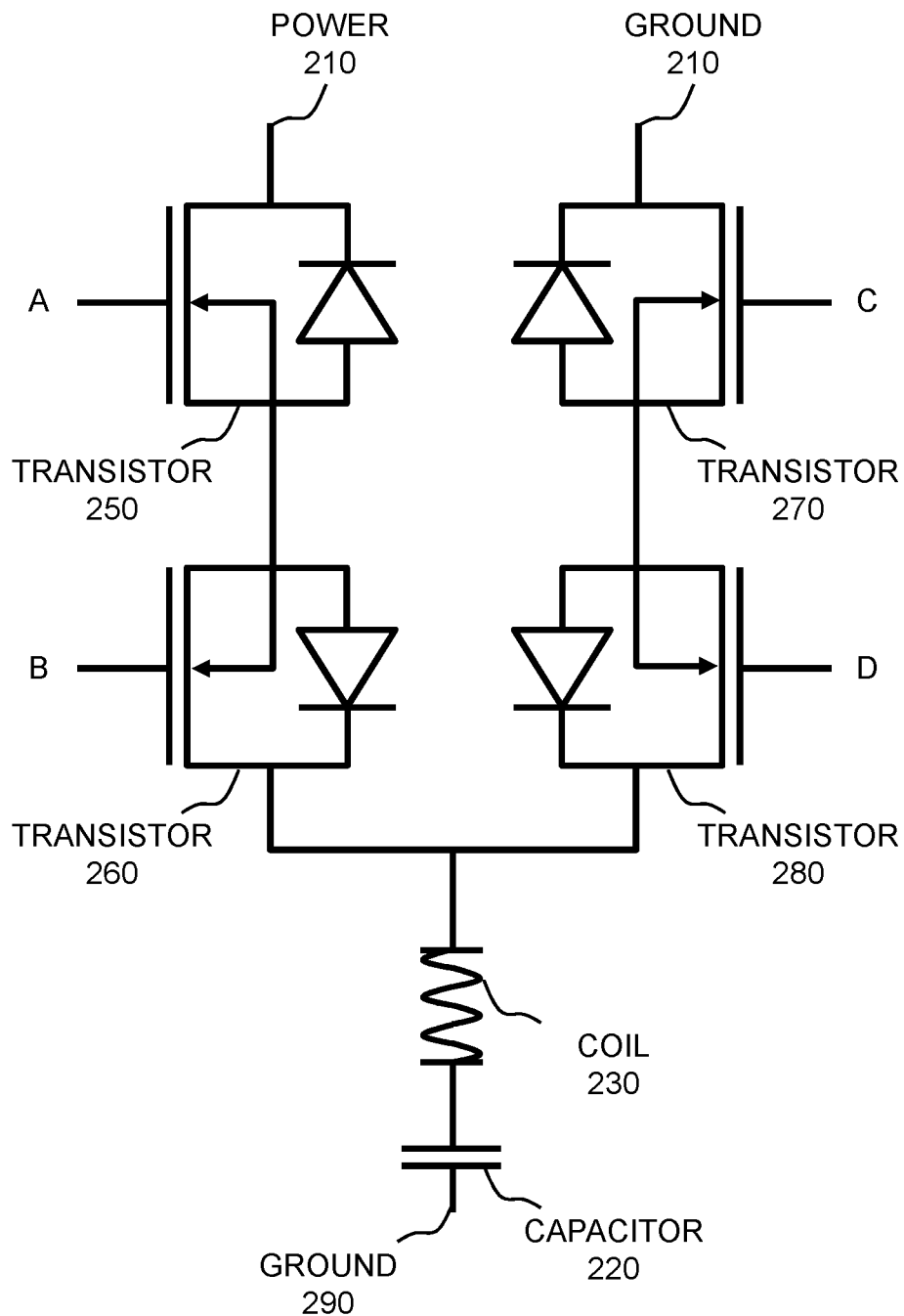
FIG. 2 depicts a diagram in accordance with one or more embodiments.

FIG. 2 depicts a diagram 200 in accordance with one or more embodiments. The diagram 200 can correspond to an example transmitter resonance circuit and drivers of the Tx 101 of FIG. 1. The diagram 200 illustrates a power 210 and a ground 211 (e.g., an AC power coming from a wall, as phase and zero respectively), a capacitor 220 (e.g., the resonant capacitor 165), a coil 230 (e.g., the transmitter coil 160), one or more transistors 250, 260, 270, and 280, and a ground 290. The one or more transistors 250, 260, 270, and 280 can be FETs, such as N-MOS and/or P-MOS FETs.

According to one or more embodiments, the driver 170 is connected to the power input stage 168. The power input stage 168 is connected to the main AC supply 103. The power input stage 168 can include full or half wave rectifier circuit with an output capacitor. For example, the output capacitor size can be selected to maintain low fluctuation (e.g., 10%) during a Tx driver oscillation cycle (e.g., 20 khz-200 khz), though the output capacitor is not large enough to maintain this low fluctuation for a full AC cycle (e.g., 50 Hz or 60 Hz). In this regard, the driver 170 can include a single FET on each side (e.g., thereby eliminating the transistors 260 and 280 of FIG. 2).

According to one or more embodiments, the controller 180 may utilize the I/O module 185 as an interface to transmit and/or receive information and instructions between the controller 180 and elements of the Tx 101 (e.g., such as the driver 170 and a wiring junction 195). For instance, the controller 180 can include a sensing circuit, circuitry, unit, and/or software for sensing voltage and/or current of the transmitter resonance circuit. The controller 180 can include a sensing circuit, circuitry, unit, and/or software for sensing voltage and/or current of the main AC supply 103. According to one or more embodiments, a transformer with multiple output points can be used to provide different output voltage levels to drive resonance transmitter resonance circuit and in combination with duty cycle control. Note that the controllers 135 and 180 can be similarly configured.

According to one or more embodiments, the controller 180 may sense, through the I/O module 185 one or more currents or voltages, such as a AC input voltage (Vin) and a AC resonance circuit voltage (Vac). According to one or more embodiments, the controller 180 can activate, through the I/O module 185, one or more switches to change the resonance frequency. Further, the Rx 102 and/or the Tx 101 can include multiple switches for multiple frequencies.

According to one or more embodiments, the controller 180 may utilize the firmware 190 as a mechanism to operate and control operations of the Tx 101. In this regard, the controller 180 can be a computerized component or a plurality of computerized components adapted to perform methods such as described herein. For example, the controllers 135 and/or 180 can include a computer program product that stores a computer readable storage medium. According to one or more embodiments, the controller 135 and 180 can also cause the system to participate in in-band communications, receiving signals from the Rx 102 by monitoring junction 195 voltage or current, and transmitting signals to the Rx 102 by controlling the driver 170.

In operation, the controller 180 can control a switching of FET control points A-D of FIG. 2. The controller 180 can control the switching directly or via an additional driver stage. The transistors 250, 260, 270, and 280 are toggled at significantly higher frequency then an AC power supply oscillating frequency. According to one or more embodiment, an FET toggling frequency can be selected (e.g., by the controller 180 according to any switching strategy) along a range of 20 khz to 200 khz. Note that a AC power supply oscillating frequency is typically 50 hz or 60 hz.

Figure 3:
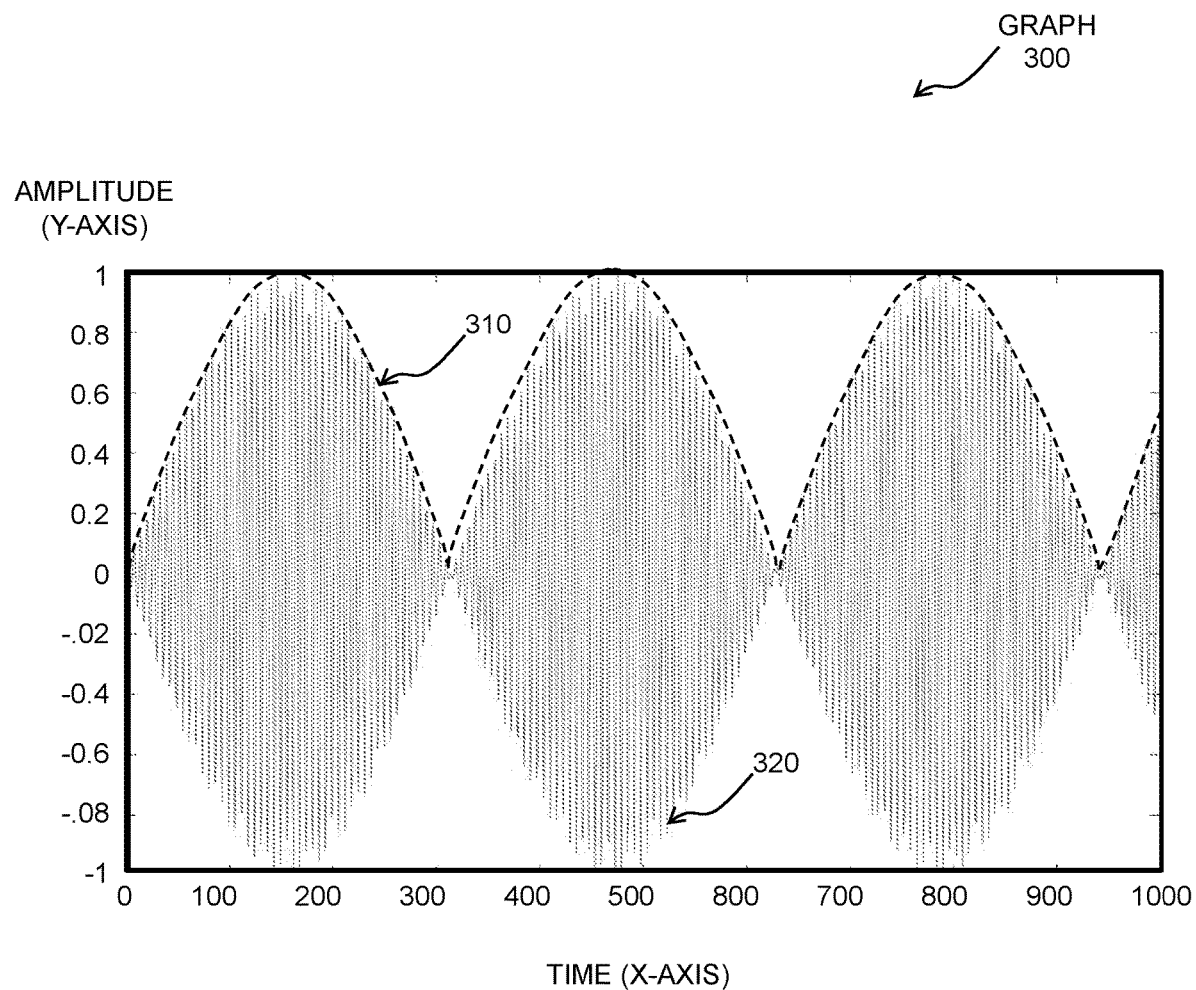
FIG. 3 depicts a graph in accordance with one or more embodiments.

A current flowing through the transmitter resonance circuit and a magnetic field that this current induces (e.g., through the coil 230) is a modulation of the main AC waveform with the high frequency AC oscillation. The current flowing through the coil 230 is further described with respect to FIG. 3, which shows a graph 300 according to one or more embodiments.

Generally, the graph 300 illustrates an AC signal or envelope 310 over a high frequency AC oscillation 320, where the amplitude (Y-axis) is modulated over time (X-axis). That is, the graph 300 shows the high frequency AC oscillation 320 as a 'fast oscillation' at 20 khz to 200 khz, which creates the AC signal or envelope 310 (i.e., an AC power oscillation envelope). According to one or more embodiments, the controller 180 synchronizes the switching of the plurality of transistors 250, 260, 270, and 280 to generate the envelope 310. Note that control over a power transferred to the Rx 102 may be provided by modification of a duty cycle of an FET toggling waveform. Also, note that a lower duty cycle for the driver 170 can yield a similar waveform with a lower current amplitude.

According to one or more embodiments, the Tx 101 and the controller 180 can take care in switching the FETs to prevent shorts of the phase and the zero. The controller 180 can also take care to prevent a complete disconnection of transmitter coil 160 due to supply and creation of voltage spikes. To achieve the switching of FETs, the controller 180 can time the switching and/or insert dead time between specific FET switches.

Figure 4:
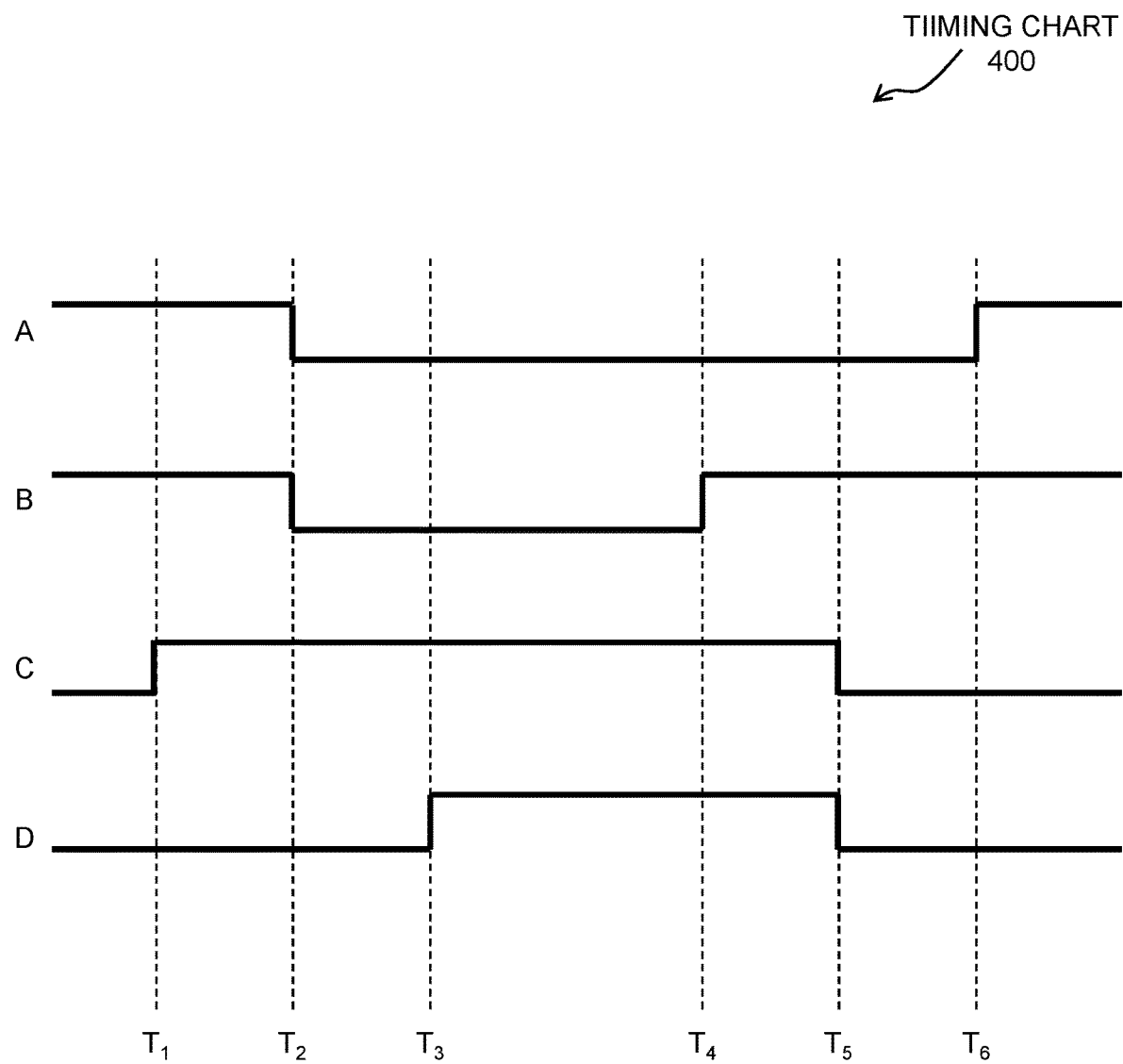
FIG. 4 depicts a timing chart in accordance with one or more embodiments.

FIG. 4 depicts a timing chart 400 in accordance with one or more embodiments. The timing chart 400 is an example of a field-effect transistor (FET) switching (i.e., an exemplary switching strategy).

The timing chart 400 includes for lines corresponding to the switching of FET control points A-D. Prior to time T1, control points A-B are high and control points C-D are low. At time T1, control point C is switched to high. At time T3, control points A-B are switched to low. At time T4, control point D is switched to high. Note that the time between time T1, time T2, and time T3 can be considered dead time.

Further, at time T4, control point B is switched to high. At time T5, control points C-D are switched to low. At time T6, control point A is switched to high. Note that the time between time T4, time T5, and time T6 can be considered dead time.

Figure 5:
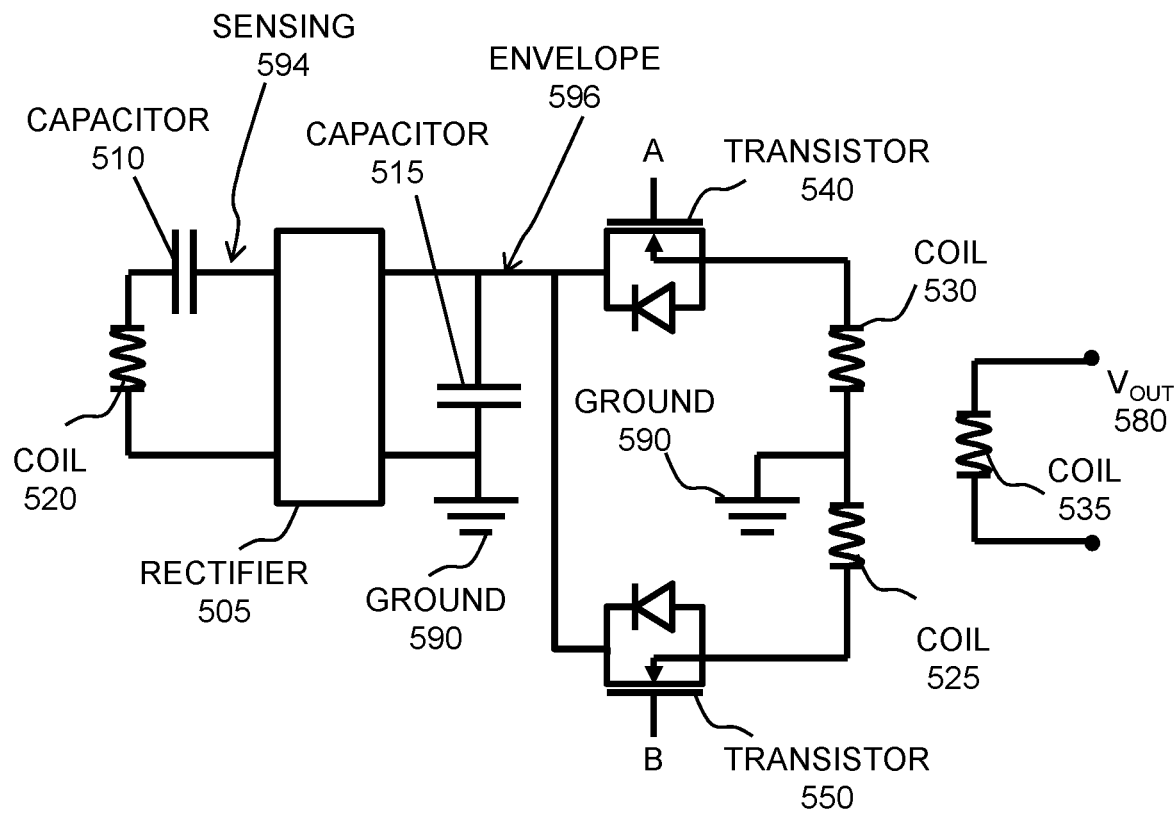
FIG. 5 depicts a diagram in accordance with one or more embodiments.

FIG. 5 depicts a diagram 500 in accordance with one or more embodiments. The diagram 500 can correspond to a receiver (e.g., Rx 102 of FIG. 1). The diagram 500 illustrates a rectifier 505, one or more capacitors 510 and 515, one or more coils 520, 525, 530, and 535, one or more transistors 540 and 550, and a ground 590. The one or more transistors 540 and 550 can be FETs. The controller 135 of FIG. 1 can further operate to perform a sensing 594. The diagram 500 illustrates an exemplary implementation of a power path, where the transistors 540 and 550 flip on and off to reconstruct an AC waveform.

The capacitor 515 for the rectifier 505 is selected as to filter out a current variance during the FET fast oscillations (as in existing receivers). One or more advantages, technical effects, and/or benefits include the Rx 102 having relatively small capacitors compared to capacitors required to filter the main AC oscillations. As an example, a capacitor for the Rx 102 operating at FET toggling frequency of 100 kHz is 20 uF for a 2A output system. To achieve similar performance for AC supply oscillations, contemporary implementations require a 40 mF capacitor, which is far larger and more expensive.

The rectifier 505 can produce an envelope 596, which is further manipulated by the coils 525 and 530, the transistors 540 and 550, and the ground 590. That is, an output of the rectification stage is the envelope 596 (of the transmitter current signal) and is therefore a single sided version of an supply AC waveform (e.g., absolute value of the main AC supply 103). To enable creation of a true AC waveform of the output, the rectified waveform needs to be inverted every half cycle. The rectifier 505 can be implemented as full wave rectifier based on didoes, FETs, or combination thereof. The rectifier 505 can be implemented to provide doubling of output voltage by utilizing two output capacitors 515 (e.g., utilizing a topology similar to that described with respect to FIG. 7).

According to one or more embodiments, an inversion can be provided by usage of a transformer with middle connection point on the input side. The center point is connected to the rectifier ground, and the upper and lower connection points of the transformer are connected via a FET to the Vrect. One of the FETs is switched on while the other is switched off. The FET control (points A & B) are switched every half cycle in synchronization with the current reaching zero level. The output of the transformer is an AC waveform with oscillation frequency matching the main AC supply 103. According to one or more embodiments, the controllers 135 and 180 of the system 100 ensure that the voltage of the output matches the main voltage and that the output is connected to the AC load.

According to one or more embodiments, a full wave driver can be utilized, including usage of dual switches to connect GND and Vrect alternately to the output signals. For example, one half of the full wave driver that connects to the phase output is connecting the output to Vrect on half of the cycle and to GND on the second half, and the second half of the driver is connecting the zero output to Vrect or GND is opposite timing to the first half driver. In turn, a need for output transformer coils is eliminated.

According to one or more embodiments, the system 100 enables communications between the Rx 102 and the Tx 101. The communications can provide at least, but not limited to, an identification of the Rx 102 and the Tx 101, a control over transmitted current/power levels, and a providing consumed power reports to assist the Tx 101 in detection of foreign object presence. On the system 101, power levels can be high and fluctuating the power levels using connection of resistive element or capacitive can be problematic. Thus, the communications can provide data in-band. For example, performing in-band data transmission during time slots around zero crossing points of an AC main waveform. During the zero crossing point, the FETs of the Tx 101 can be kept entirely closed and the Rx 102 can simply inject a signal to a resonance system that is sensed by the Tx 101 as fluctuation on a main coil voltage.

For example, a time slot of 400 usec (i.e., a width of the time slot) centered around a zero crossing of the AC main waveform can be defined. During this time slot (e.g., for the width of 400 usec), the Tx 101 keeps a driver FET at constant connection to zero. The Rx 102 can use the time slot to inject current waveform carrying data. This may be digital modulation that carries specific packet structure for transfer of control and power information.

Figure 6:
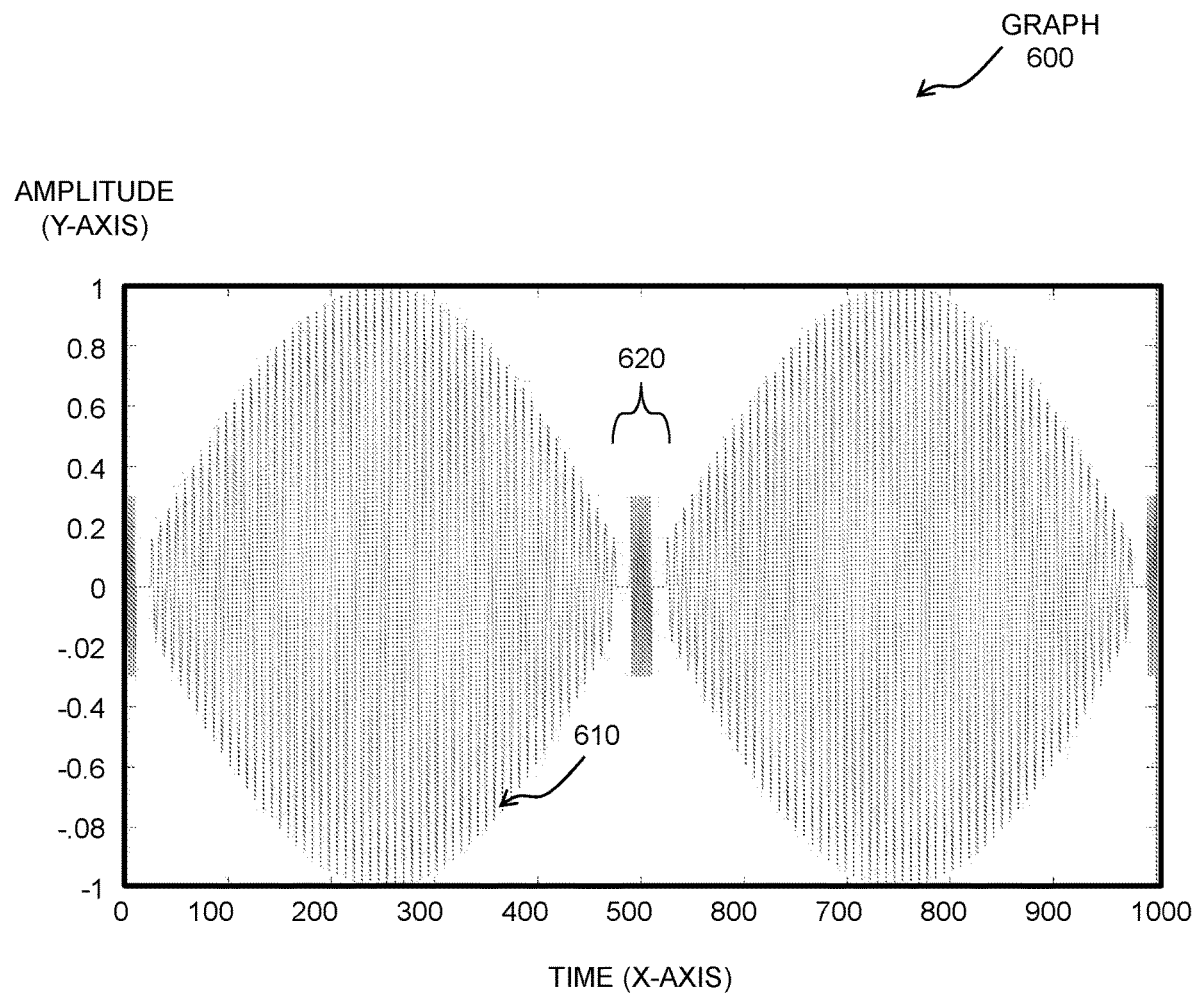
FIG. 6 depicts a graph in accordance with one or more embodiments.

Turning to FIG. 6, a graph 600 of Rx data inserted on a zero slot of the Tx 101 power is shown in accordance with one or more embodiments. Generally, the graph 600 illustrates an amplitude (Y-axis) modulated over time (X-axis). That is, the graph 600 illustrates a conceptual view of a current 610 on the main coil during a full AC main cycle, where slots 620 around the zero crossings of the AC main signal is silenced. More particularly, the driver 170 of the Tx 101 sets the coil 160 to zero, and the Rx 102 uses the slot to transmit data (which is seen as current on the coil 160). As an example, the slot 620 can be used to transfer a digital waveform for 50 bits, each transmitted over 8 usec. Note that a '0' bit and a '1' bit can be used for different pulse shapes. The 50 bits may be sub-divided into preamble bits and data bytes with start, data, stop and parity bits.

According to another embodiment, the slot 620 can be used to sense foreign object objects. Sensing of the foreign object can be performed by sending a short pulse via the Tx 101 or the Rx 102 (i.e., resonance circuit therein) and measuring a decay pattern and/or a rate and oscillation frequency.

According to another embodiment, a time slot adjacent to the slot 620 can be used to of power consumption. The Tx 101 measures driven power at that the slot 620, the Rx 102 measures received power during the same timeslot, and the Rx 102 reports back to the Tx 101 on a next communication slot. The Tx 101 can use the information to determine if foreign object is present and consuming part of the transmitted power. Usage of the slot adjacent or close to the zero crossing (e.g., the slot 620) ensures that a power level at that slot is relatively low compared to maximum or average power transfer of the system 101. As the accuracy of the system 101 is decreased with the increase of power levels, the system 101 provides strong advantage in using a relatively low power slot for such measurements.

Figure 7:
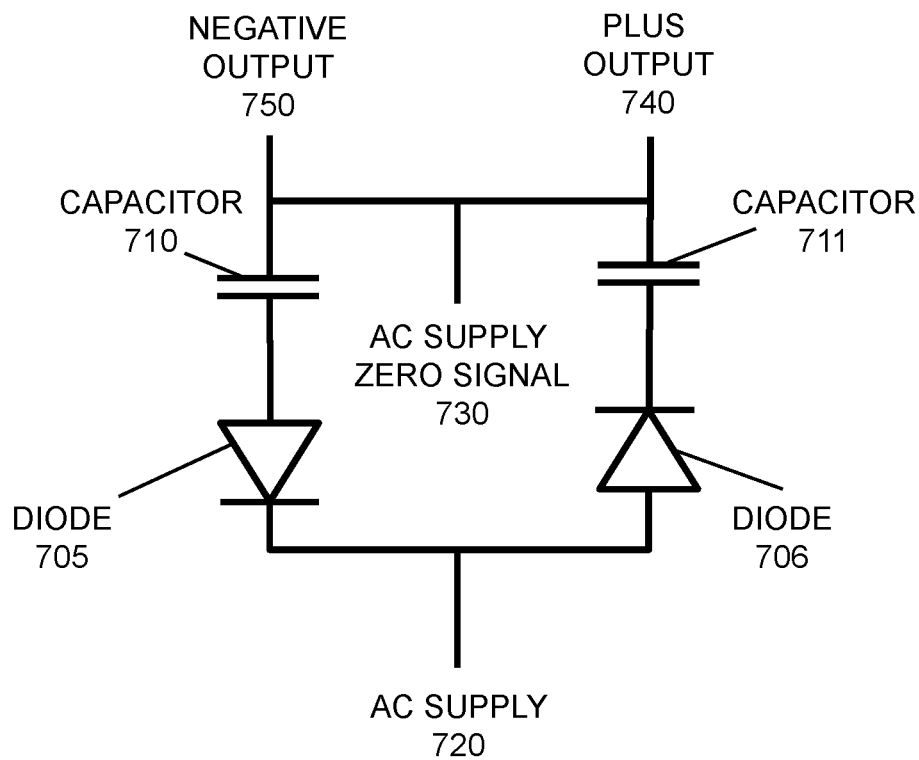
FIG. 7 depicts a diagram in accordance with one or more embodiments.

FIG. 7 depicts a diagram 700 in accordance with one or more embodiments. The diagram 700 can correspond to an AC rectifier circuit used to double an output voltage. The AC rectifier circuit can be used in the power input stage 168 of the Tx 101 and/or in the rectifier 140 of the Rx 102.

The diagram 700 illustrates diodes 705 and 706 and output capacitors 710 and 711. According to one or more embodiments, the diodes 705 and 706 can alternatively be FETs or other type of transistors. The diodes 705 and 706 are connected in reverse polarity to each other with one side connected to a phase of an AC supply 720 and another side to the matching capacitors (i.e., the output capacitors 710 and 711). Second sides of the output capacitors 710 and 711 are connected to an AC supply zero signal 730. The second sides of the output capacitors 710 and can are also connected to a rectifier output (e.g., the capacitor 711 can be connected to a plus output 740, and the capacitor 710 can be connected to a negative output 750.

Figure 8:
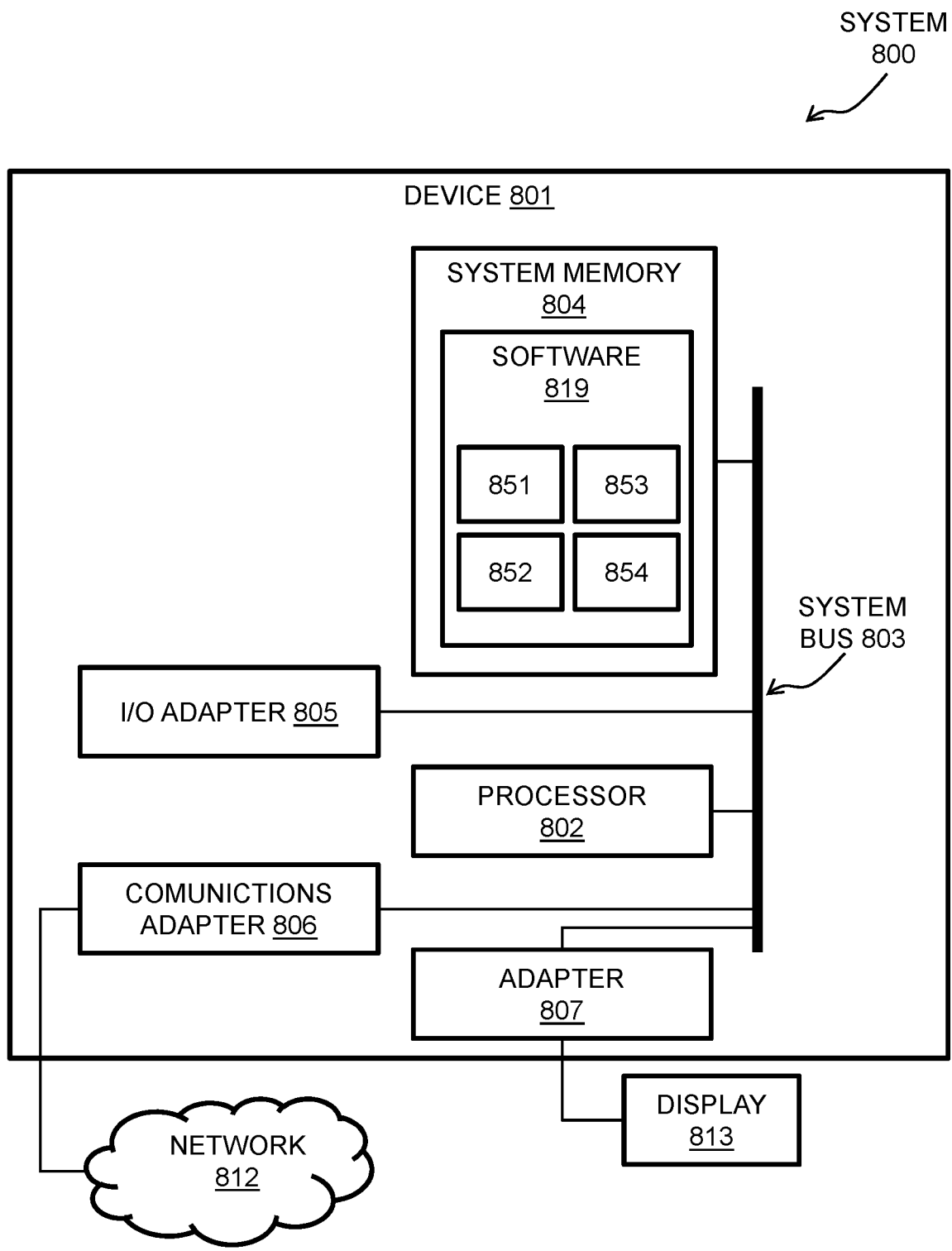
FIG. 8 depicts a system in accordance with one or more embodiments.

FIG. 8 depicts a system 800 in accordance with one or more embodiments. The system 800 has a device 801 (e.g., the Rx 102 and/or the Tx 101 of the system 100 of FIG. 1) with one or more central processing units (CPU(s)), which are collectively or generically referred to as processor(s) 802 (e.g., the controllers 135 and 180 of FIG. 1). The processors 802, also referred to as processing circuits, are coupled via a system bus 803 to system memory 804 and various other components. The system memory 804 can include a read only memory (ROM), a random access memory (RAM), internal or external Flash memory, embedded static-RAM (SRAM), and/or any other volatile or non-volatile memory.

For example, the ROM is coupled to the system bus and may include a basic input/output system (BIOS), which controls certain basic functions of the device 801, and the RAM is read-write memory coupled to the system bus 803 for use by the processors 802.

FIG. 8 further depicts an I/O adapter 805, a communications adapter 806, and an adapter 807 coupled to the system bus 803. The I/O adapter 805 may be a small computer system interface (SCSI) adapter that communicates with a drive and/or any other similar component. The communications adapter 806 interconnects the system bus 803 with a network 812, which may be an outside network (power or otherwise), enabling the device 801 to communicate data and/or transfer power with other such devices (e.g., such as the Tx 101 connecting to the Rx 102). A display 813 (e.g., screen, a display monitor) is connected to the system bus 803 by the adapter 807, which may include a graphics controller to improve the performance of graphics intensive applications and a video controller. Additional input/output devices cab connected to the system bus 803 via the adapter 807, such as a mouse, a touch screen, a keypad, a camera, a speaker, etc.

In one embodiment, the adapters 805, 806, and 807 may be connected to one or more I/O buses that are connected to the system bus 803 via an intermediate bus bridge. Suitable I/O buses for connecting peripheral devices such as hard disk controllers, network adapters, and graphics adapters typically include common protocols, such as the Peripheral Component Interconnect (PCI).

The system memory 804 is an example of a computer readable storage medium, where software 819 can be stored as instructions for execution by the processor 802 to cause the device 801 to operate, such as is described herein with reference to FIGS. 1-8. In connection with FIG. 1, the software 819 can be representative of firmware 190 for the Tx 101, such that the memory 804 and the processor 802 (e.g., the controller 180) logically provide a FIR equalizer 851, an analyzer 852 of in-band communication data, a selector for selecting a ping, a coupler 853 for dynamically determining a coupling factor, a regulator 854 for dynamically determining an operating frequency, etc.

As indicated herein, embodiments disclosed herein may include apparatuses, systems, methods, and/or computer program products at any possible technical detail level of integration. The computer program product may include a computer readable storage medium (or media) having computer readable program instructions thereon for causing a controller to carry out aspects of the present invention.

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein can be communicated and/or downloaded to respective controllers from an apparatus, device, computer, or external storage via a connection, for example, in-band communication. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wireless power transmitter comprising:
a coil configured to provide a magnetic field for a wireless power transfer in accordance with an alternating current power supply providing an alternating current input at a first frequency;
a plurality of transistors configured to couple to a phase and a zero of the alternating current power supply; and
a controller configured to switch the plurality of transistors at a second frequency to drive a current across the coil that induces the magnetic field, the current comprising an envelope that corresponds to the first frequency of the alternating current input.

2. The wireless power transmitter of claim 1, wherein the second frequency is greater than the first frequency.

3. The wireless power transmitter of claim 1, wherein the first frequency comprises 50 Hz or 60 Hz.

4. The wireless power transmitter of claim 1, wherein the second frequency is selected from a range of 20 khz to 200 khz.

5. The wireless power transmitter of claim 1, wherein one or more time slots around each zero crossing of the current are utilized for in-band communications by the wireless power transmitter with a wireless power receiver.

6. The wireless power transmitter of claim 1, wherein the controller synchronizes the switching of the plurality of transistors to generate the envelope.

7. The wireless power transmitter of claim 1, wherein the controller inserts dead time between the switching of the plurality of transistors to prevent one or more shorts of the phase or the zero of the alternating current power supply.

8. The wireless power transmitter of claim 1, wherein the plurality of transistors comprise field effect transistors.

9. The wireless power transmitter of claim 8, wherein the zero and the phase of the alternating current power supply are connected via two back-to-back N-type metal-oxide-semiconductor (N-MOS) or P-type metal-oxide-semiconductor (P-MOS) field effect transistors.

10. A wireless power receiver comprising:
a controller;
a coil configured to receive a magnetic field for a wireless power transfer from a wireless power transmitter;
a rectifier configured to produce, as an output, an envelope of a transmitter current signal;
a plurality of transistors configured to produce an absolute value of the envelope based on a switching by the controller.

11. The wireless power receiver of claim 10, wherein the rectifier of the wireless power transmitter comprises a voltage doubling circuit.

12. The wireless power receiver of claim 10, wherein the wireless power receiver comprises one or more rectifier capacitors sized to maintain a fluctuation during a wireless power receiver driver oscillation cycle.

13. The wireless power receiver of claim 10, wherein the rectifier is configured to provide a full alternating current wave reconstruction using a transformer or full wave driver.

14. The wireless power receiver of claim 10, wherein one or more time slots around each zero crossing of the current are utilized for in-band communications by the wireless power receiver with the wireless power transmitter.

15. The wireless power receiver of claim 14, wherein the wireless power receiver uses the one or more time slots to transmit a digital waveform for 50 bits.

16. The wireless power receiver of claim 15, wherein the digital waveform is transmitted over 8 usec.

17. The wireless power receiver of claim 10, wherein the wireless power receiver provides an alternating current power to an alternating current motor in accordance with the absolute value of the envelope.

18. The wireless power receiver of claim 10, wherein the plurality of transistors comprise field effect transistors.

19. A system comprising:
- a wireless power transmitter configured to provide a magnetic field for a wireless power transfer in accordance with an alternating current power supply providing an alternating current input at a first frequency, the wireless power transmitter comprising:
  - a plurality of first transistors configured to couple to a phase and a zero of the alternating current power supply, and
  - a controller configured to switch the plurality of first transistors at a second frequency to drive a current across a coil that induces the magnetic field, the current comprising an envelope that corresponds to the first frequency of the alternating current input; and
- a wireless power receiver configured to receive the magnetic field for the wireless power transfer, the wireless power receiver comprising:
  - a rectifier configured to produce, as an output, the envelope of a transmitter current signal corresponding to the current, and
  - a plurality of second transistors configured to produce an absolute value of the envelope based on a switching.

20. The system of claim 19, wherein one or more time slots around each zero crossing of the current are utilized for in-band communications between the wireless power receiver and the wireless power transmitter.

\* \* \* \* \*